United States Patent
Sitek et al.

(10) Patent No.: US 10,368,651 B2
(45) Date of Patent: Aug. 6, 2019

(54) APPARATUS FOR PROVIDING BALANCE AND STABILITY WHILE STANDING

(71) Applicants: Catherine DeNardo Sitek, Saint Clair Shores, MI (US); Gerald Thomas Sitek, Saint Clair Shores, MI (US)

(72) Inventors: Catherine DeNardo Sitek, Saint Clair Shores, MI (US); Gerald Thomas Sitek, Saint Clair Shores, MI (US)

( * ) Notice: Subject to any disclaimer, the term of this patent is extended or adjusted under 35 U.S.C. 154(b) by 76 days.

(21) Appl. No.: 15/169,781

(22) Filed: Jun. 1, 2016

(65) Prior Publication Data
US 2017/0143128 A1    May 25, 2017

Related U.S. Application Data

(60) Provisional application No. 62/386,145, filed on Nov. 20, 2015.

(51) Int. Cl.
*A47C 16/04*    (2006.01)
*A47C 7/74*    (2006.01)

(52) U.S. Cl.
CPC .............. *A47C 16/04* (2013.01); *A47C 7/742* (2013.01); *A47C 7/748* (2013.01)

(58) Field of Classification Search
CPC .................................. A47C 16/04; A47C 16/02
USPC ..................................................... 297/423.11
See application file for complete search history.

(56) References Cited

U.S. PATENT DOCUMENTS

| | | | |
|---|---|---|---|
| 4,589,699 A | | 5/1986 | Dungan |
| 4,765,684 A | * | 8/1988 | Kvalheim .............. A47C 9/005 297/313 |
| 5,149,174 A | | 9/1992 | Charash |
| 5,186,519 A | * | 2/1993 | Larson .................... A47C 9/005 297/338 |
| 5,884,935 A | * | 3/1999 | Tholkes ................... A61G 5/14 280/650 |
| D425,713 S | * | 5/2000 | Tholkes ......................... D6/335 |
| 6,086,157 A | * | 7/2000 | Toso ...................... A47C 9/005 297/383 |

(Continued)

FOREIGN PATENT DOCUMENTS

| | | |
|---|---|---|
| CA | 2805158 A1 | 8/2014 |
| CN | 201854940 U | 6/2011 |

(Continued)

OTHER PUBLICATIONS

International Search Report and Written Opinion of the International Searching Authority for Application No. PCT/US2016/061227, dated Mar. 6, 2017.

*Primary Examiner* — David R Dunn
*Assistant Examiner* — Tania Abraham
(74) *Attorney, Agent, or Firm* — Brooks Kushman P.C.

(57) ABSTRACT

A balance and stability system for use by an individual who is required to maintain a standing position for a prolonged period includes a balance reference and support pad positioned to contact the individual at their shins while standing at a work station, which balance and support pad is mounted on a support structure including an elongate support arm such that the pad is at the proper vertical and horizontal location to provide a balance point of contact with the individual's shins and, yet, a completely open space is provided between the pad and the floor to thereby allow for free movement of the individual's feet forward, backward, and side-to-side.

19 Claims, 5 Drawing Sheets

(56) References Cited

U.S. PATENT DOCUMENTS

| | | | |
|---|---|---|---|
| 6,440,046 B1* | 8/2002 | Tholkes | A61G 5/14 280/250.1 |
| 8,251,181 B2 | 8/2012 | Schapiro | |
| 2006/0082206 A1* | 4/2006 | Travis | A47C 9/002 297/423.11 |
| 2007/0063569 A1* | 3/2007 | Mays | A47C 9/005 297/423.12 |
| 2015/0164235 A1 | 6/2015 | Zager et al. | |

FOREIGN PATENT DOCUMENTS

| | | |
|---|---|---|
| DE | 3515171 A1 | 10/1985 |
| FR | 2729837 A1 | 8/1996 |
| JP | H0788261 A | 4/1995 |
| JP | 2003135529 A | 5/2003 |

* cited by examiner

APPARATUS FOR PROVIDING BALANCE AND STABILITY WHILE STANDING

CROSS-REFERENCE TO RELATED APPLICATIONS

This application claims the benefit of U.S. provisional application Ser. No. 62/386,145; filed Nov. 20, 2015, the disclosure of which is hereby incorporated in its entirety by reference herein.

TECHNICAL FIELD

The present invention relates to an apparatus for providing balance and stability to persons who are required to maintain a standing position for extended time periods.

BACKGROUND

There are many jobs and other environments that require workers/participants to stand for extended periods of time. Unfortunately, it is well known that maintaining a fixed body position for prolonged periods increases the likelihood of muscle tension, fatigue and pain, and may cause individuals to adopt detrimental postures.

In particular, it is known that individuals required to stand for prolonged periods report increased incidents of lower back, foot, and ankle pain, physical fatigue, muscle pain, leg swelling, and general physical and mental fatigue as a result of prolonged standing. Common typical adjustments include shifting ones weight from one foot to the other to provide relief. However, while providing some temporary relief to the non-weight bearing foot, leg, and hip, this posture adjustment effectively doubles the weight supported by the single weight-bearing foot, leg, and hip.

Another typical temporary adjustment to relieve the stress of prolonged standing is to hyperextend or "lock" ones knees. However, maintaining this hyperextended position can reduce or temporarily cut off blood circulation, causing increased instability and potential loss of balance.

Another simple accommodation individuals often make is to lean forward in their stance and support themselves partially with one or both hands while working in a standing position. While this additional support may also provide some temporary relief to the feet and legs, it may place the individual in an out-of-balance position which may place greater strain on the lower back, and which may limit the individual's free use of their hands, as well as limit their ability to maintain balance.

Another detrimental aspect of prolonged standing is body sway. This subtle, unconscious movement to maintain proper positioning of the individual's center of gravity over their feet while standing still may create a momentary sense of loss of balance, and typically increases muscle tension and hastens muscle fatigue. Individuals required to stand for long periods often report foot pain and muscle fatigue from clinching ones toes, as well as leg and lower back pain and muscle fatigue from constant pulling to maintain one's center of gravity over one's feet.

Various devices have been utilized to mitigate the pain and fatigue caused from prolonged standing, such as floor mats, shoe inserts, adjustable chairs, sit-stand work stations, and compression stockings. Other ergonomic devices, such as manufacturing lifting assists, standing desks, and various braces have also been proposed to minimize the detrimental symptoms of prolonged standing. However, these devices are limited in their effectiveness, often limiting the user's mobility and balance.

In particular, U.S. Pat. No. 5,149,174, issued to Charash for an "Ergonomic Stand", discloses a support stand adapted to provide support for an individual's posterior and knees as the individual maintains a modified standing position. However, the structure disclosed by Charash requires that the user step into and position themselves within the stand for support from both the front and the rear. Thus, while the Charash device may provide some weight-bearing support, it does not necessarily encourage the individual to maintain a proper balanced position, it may limit the mobility of the user at his/her work station, and it makes it more difficult for the individual to move easily to or from the work station.

SUMMARY

According to one aspect of the present disclosure, a balance and stability system is disclosed for use by an individual who is required to maintain a standing position for a prolonged period, the system including a balance reference and support pad positioned to contact the individual at their shins while standing at a work station. The balance and support pad is mounted on or near the work station such that the pad is at the proper vertical and horizontal location to provide a balance point of contact with the individual's shins and, yet, provide a completely open space between the pad and the floor to thereby allow for free movement of the individual's feet forward, backward, and side-to-side. This simple, yet affective structure provides effortless ingress and egress to and from the work station, and allows the user to position their feet relative to the pad to place the pad at the proper balance point without requiring the user to lift their feet or otherwise look down to avoid contact with support structure.

The pad may be connected to the work station, to the floor, or to a floor stand, by virtue of a horizontally extending support arm, which support arm supports the pad in a cantilevered fashion such that the pad is positioned at the proper location without any structure obstructing the area between the pad and the floor, or in any of the pathways which provide entry or exit from the work station.

The pad may be secured to the support arm using one or more adjustment mechanisms which allow for the pad to be released, moved to the desired horizontal, vertical, and angular position, and then locked in position for use by a particular individual. The pad may be provided with a padded surface to provide cushioned support should the individual decide to lean forward for support while standing. Additionally or alternatively, the pad may be provided with other mechanisms to assist the individual in sensing, achieving and maintaining the proper balance point with little or no actual physical contact with the pad.

In one embodiment, an electromagnetic device may be placed on the pad to provide a magnetic field in the region of the balance/support surface of the pad. Complimentary devices may be attached to the individual's shins to provide magnetic fields of opposite polarity, such that during operation, the user can sense the balance point as his/her shins move in close enough proximity to the pad that magnetic repulsion is detected. Thus, continuous feedback, as well as a continuous sense of balance, may be achieved with the system providing little or no weight-bearing support of the individual.

In a similar alternative embodiment, the pad may be provided with a device which transmits low frequency sound waves, such that the user can feel the low frequency sound emitted from the pad as the user's shins move near to the pad (at the desired balance point) thereby providing balance point feedback with limited or no actual physical contact with the user's shins.

In another disclosed embodiment, a mechanical vibrating mechanism may be provided on the contact surface of the pad to provide an enhanced signal to the user that the user's shins are in the proper balance position, as well as providing relaxing vibration for the muscles in the lower legs and feet when the user's leg is maintained in contact with the pad.

In another disclosed embodiment, a hot or cold temperature source may be provided on the contact surface of the pad to provide an additional thermal sensation, signaling the user that the user's shins are in the proper balance position.

It will be appreciated that the various disclosed embodiments of the balance and support system may be utilized in myriad applications and work environments promote balance and stability, and reduce fatigue, for individuals that are required to stand at a location or workstation for an extended period.

These and other aspects of the disclosure will be more fully explained with reference to the attached drawings and the following detailed description.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
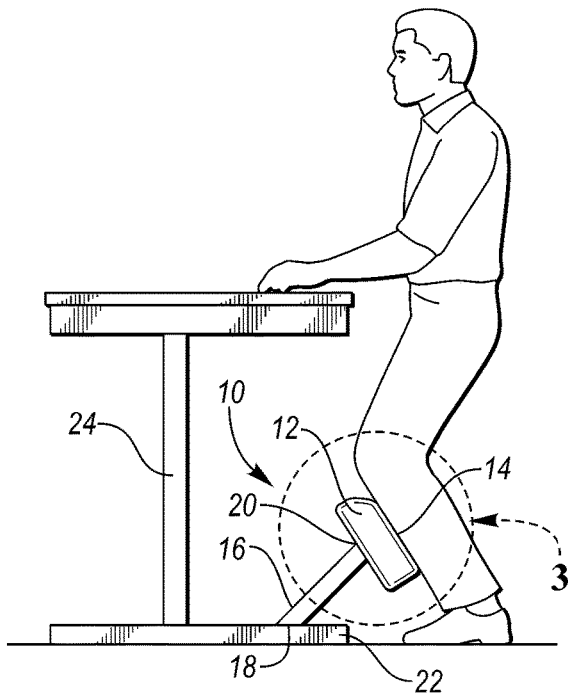
FIG. 1 is a side view of one embodiment of the disclosed balance and stability system mounted on a stand-up desk.

Referring to FIG. 1, in one embodiment of the disclosed balance and stability system, generally referred to as 10, the system 10 includes a balance reference pad 12 including a contacting surface 14 for engaging the shin of an individual standing at a specified location such that upon contact of the individual's shin with the contacting surface 14, the individual's lower leg is angled forward, and the knees bent sufficiently to ensure that the individual is standing in balance. In this disclosed embodiment, the system 10 includes an elongate support arm 16 having first and second ends, 18 and 20 respectively. The first end 18 of the support arm 16 may be fixedly secured to the support base 22 of a standup desk 24, and the second end 20 may be connected to the pad 12.

In the disclosed embodiment of FIG. 1, the support arm 16 extends upward and outward from the desk base 22 such that the pad 12 is positioned to provide the contacting surface 14 at the proper location to ensure that, when an individual is standing at the desk 24, contacted the individual's shin places the individual in a balanced standing position. The upward and outward extension of the support arm 16 also provides an uninterrupted opening below and on each side of the pad 12 to allow the user to move his/her feet forward (such as when he/she is approaching the desk), rearward (such as when he/she is leaving the desk 24), or from either side without contact or interference with any support structure.

It will be appreciated that the system 10 may be robust enough to support the weight of an individual (100+ pounds). However, it should also be appreciated that the system 10 need not support any significant weight to be effective in providing an individual with balance assistance. Indeed, if the contact surface 14 of the pad is properly positioned, mere contact with the contact surface 14 will cue the user that he/she is in balance, thereby limiting the sub-conscious rocking and alternate muscle tensing and relaxation that often accompanies maintaining a standing position for prolonged periods. Thus, by providing either subtle contact or some support, the disclosed system 10 assists individuals in maintaining a standing position for prolonged periods while reducing the fatigue that normally accompanies this task.

The pad 12 may be fabricated of one (see FIG. 1) or more (see FIGS. 7 and 8) generally planar panels, which may be fabricated from plastic, wood, metal, or other material suitable to support the force applied by one or both of a user's shins. The pad 12 may also be provided with a foam or other soft surface layer, as well as a fabric, vinyl, or leather cover, as desired, to make the pad suitably comfortable, maintainable, wear-resistant, and attractive.

The support structure described in the various embodiments disclosed herein may be fabricated from any commercially available high-strength structural materials such as molded plastic, metal, and or wood. Similarly, the pivot pins may be any of a variety of commercially available fasteners, such as, for example, releasable screw fasteners, which may allow the user to tighten or loosen the pivot(s) to adjust the support structure as desired.

Figure 2:
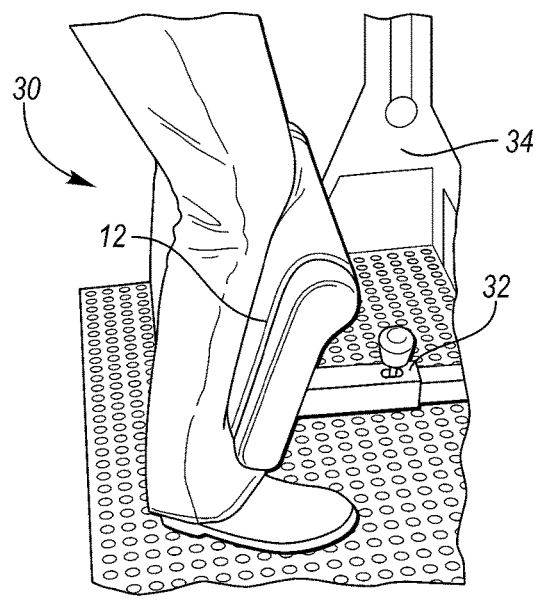
FIG. 2 is a partial perspective view of another embodiment of the disclosed balance and stability system mounted on a machine workstation.

FIG. 2 illustrates another embodiment of the disclosed system 30. System 30 similarly includes a balance reference pad 12 fixedly secured to a telescoping support arm 32 which allows the user to adjust the position of the pad 12 forward and rearward relative to the machine 34 to which the support arm 32 is attached.

Figure 3:
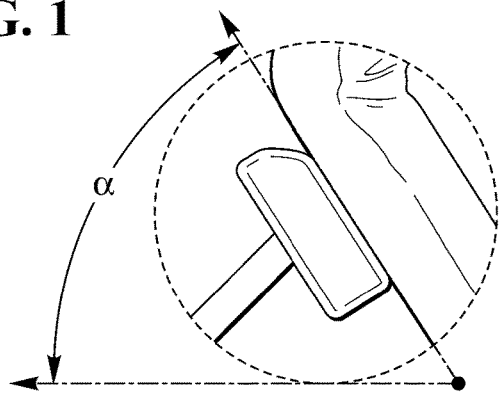
FIG. 3 is a diagram illustrating the angle of a user's lower leg and the pad's contact surface relative to the floor when the user is standing in a balanced position.

As illustrated in FIG. 3, it is desirable that the contact surfaces of the pads 12 of the disclosed embodiments of FIGS. 1 and 2, as well as the other embodiments disclosed herein, be positioned such that when an individual user is standing at the desired location relative to the desk, machine, or other workstation, the associated balance and stability system contact surface provides the user with a balance reference point which places the user's lower leg at an angle relative to the floor that causes a knee bend suitable to center the users center of gravity comfortably over his/her feet. It has been found that this angle, $\alpha$, may be in the range of 0° (i.e., standing upright) to 90° (e.g., when the lower leg/shin is rest atop the pad). The pad is preferably positioned to provide contact/support when the lower leg is angled at about 70° to 80°. In particular, it has been found that providing a balance reference and or support which places the lower leg at an angle of about 73° is most effective. Thus, for those embodiments in which the pad is a generally planar surface, the pad may be positioned such that the contact surface is similarly angled relative to the floor.

Figure 4:
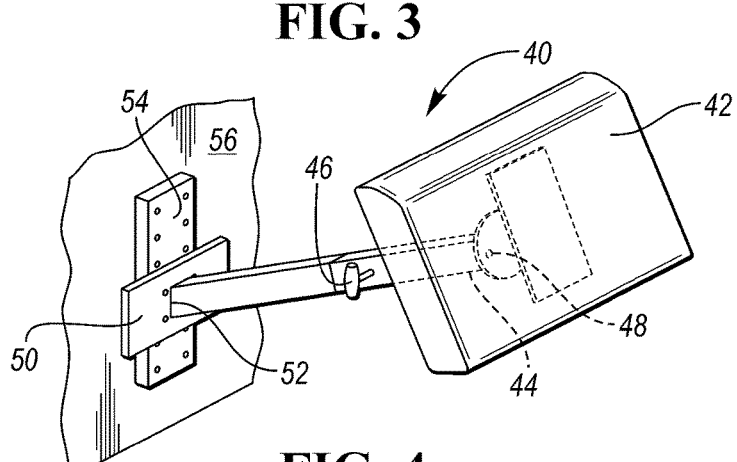
FIG. 4 is a side perspective view of another embodiment of the disclosed system including an adjustable mount plate which is attached to any suitable location.

FIG. 4 illustrates another embodiment of the system 40 wherein the balance reference pad 42 is pivotally mounted at one end 44 of a support arm 46, via pin 48, to allow for rotational adjustment of the pad 42. In this disclosed environment support arm 46 is an adjustable, telescoping arm to allow for adjustment of the pad 42 nearer or farther from the workstation to which it is attached. A mounting plate 50 is fixedly secured to the other end 52 of support arm 46. Mounting plate 48 in turn may be either permanently or releasably secured to a second mounting plate 54, which second mounting plate 54 is either permanently or releasably secured to the base 56 or other rigid frame member of the workstation with which system 40 is associated.

Figure 5:
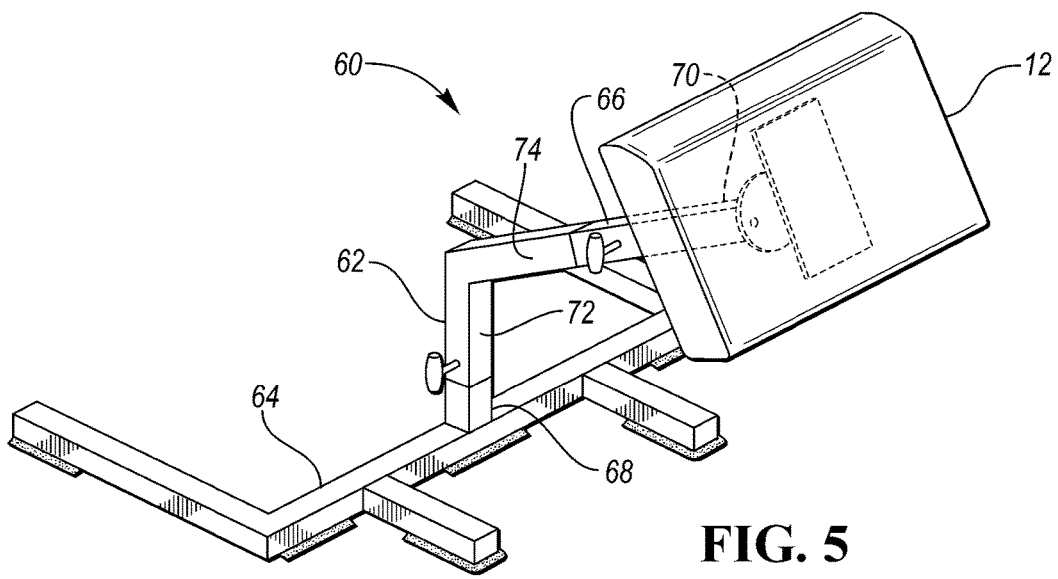
FIG. 5 is an elevated perspective view of another embodiment of the disclosed system mounted on a floor stand.

FIG. 5 illustrates another embodiment of the system 60 wherein the balance reference pad 12 is mounted on a support stand 62 which may be positioned for use at one or more workstations. The support stand 62 includes a base 64 and an adjustable support arm 66. The support arm 66 is secured to the base at one end 68 and pivotally secured to the pad 12 at its other end 70. In this disclosed embodiment, the support arm 66 includes a generally vertical portion 72 and a generally horizontally angled portion 74. Each of the vertical portion 72 and horizontal portion 74 of the support arm are adjustable to allow the river respective arm portions 72 and 74 extended or reduced in length to thereby position the balance reference pad 12 at its desired location. The support stand 62 is sufficiently weighted, and/or secured to the floor, such that the stand supports the weight of the support arm 66 and pad 12 in their extended positions away from the base 64 to thereby ensure that there is no merit uninterrupted space immediately below and at the sides of pad 12 to allow an individual user's feet to move into and out of position at the workstation without encountering interference from the stand 62.

Figure 6:
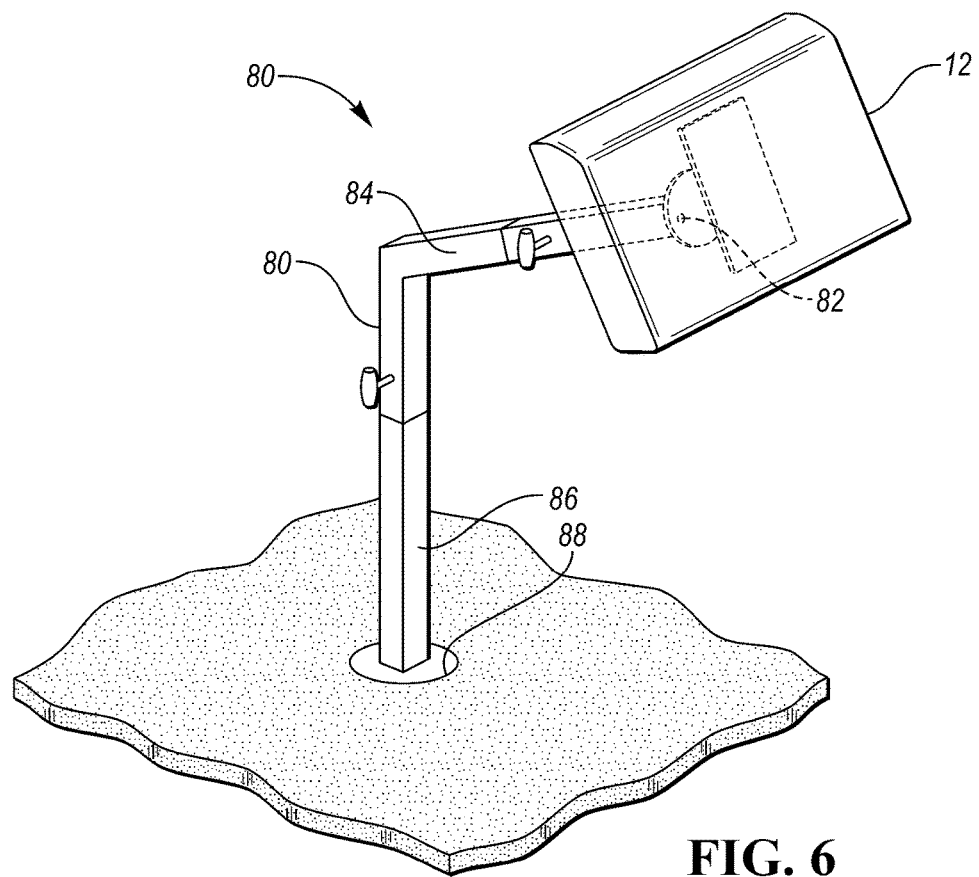
FIG. 6 is an elevated perspective view of another embodiment of the disclosed system mounted in-floor.

FIG. 6 illustrates another embodiment of the balance and support system 80 which may be permanently or removably mounted directly in the floor. In this disclosed embodiment balance reference pad 12 is pivotally mounted at one end 82 of a support arm 84. Support arm 84 is mounted at its other end 86 in receptacle 88 in the floor. In the disclosed embodiment receptacle 88 has a rectangular aperture that matches the cross-sectional shape of the second and 86 of the support arm 84 was sufficient precision that support arm and 86 may be inserted in receptacle 88 and securely retained therein. It will be appreciated that this embodiment of the system 80 may allow for the removal and placement of the balance reference pad 12 and support arm 84 in one of multiple receptacles 88 associated with a plurality of workstations.

Figure 7:
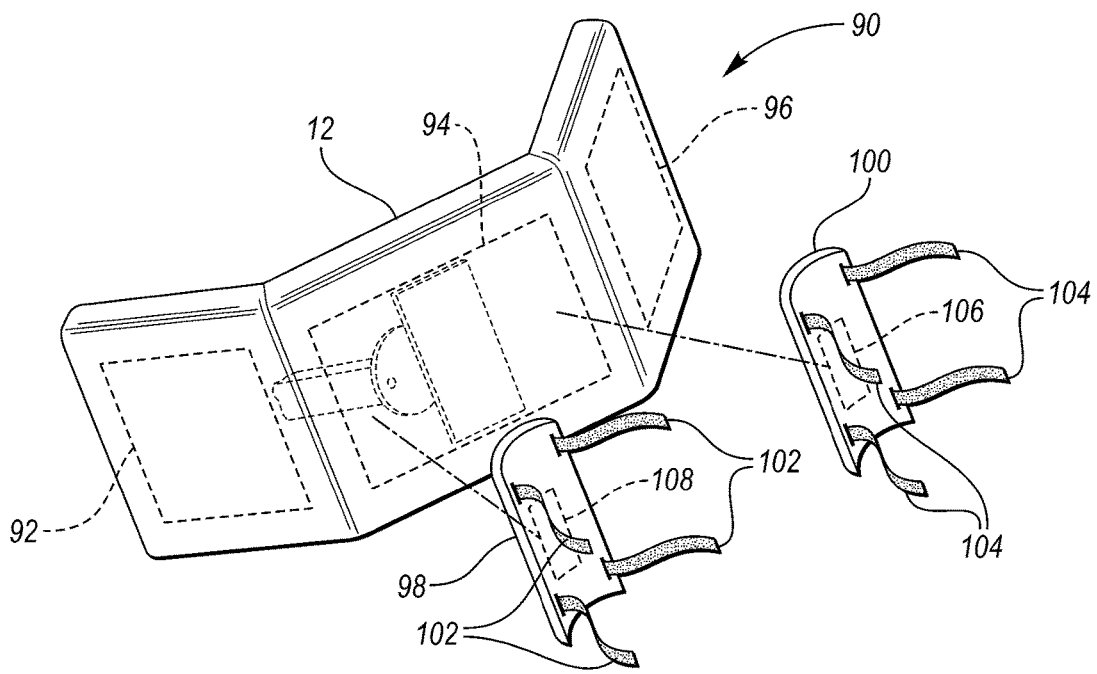
FIG. 7 is a partial elevated perspective view of another embodiment of the disclosed system incorporating a magnetic field balance reference.

Referring now to FIG. 7, in another embodiment of the system 90, the balance reference pad 12 includes one or more magnets 92, 94, 96, which may be located immediately beneath any padding or trim cover (not shown) which may be placed on the pad 12. In this disclosed embodiment each of magnets 92, 94, and 96 are electromagnets which produce a magnetic field when powered by a suitable conventional electrical power source (not shown). One or more detachable shin attachments 98, 100 may be provided to be worn by the user. Each of the shin attachments 98, 100 may include one or more conventional straps or laces 102, 104 to allow the user to quickly install the shin attachments 98, 100 on their shins. Each of the shin attachments 98, 100 also includes one or more magnets 106, 108 which may be configured to be opposite in polarity to magnets 92, 94, and 96 to thereby create a repulsive force when the wearer of the shin attachments 98, 100 is in close proximity to the balance reference pad 12. It will be appreciated that this magnetic repulsive force may provide adequate feedback to the user that the user is standing in a balanced position even when the user's shins do not come into actual contact with the balance reference pad 12. Again, of course, the pad 12 may be mounted to any of the support structures disclosed herein in such a manner that the user may alternatively rest one or both of his/her shins on the pad 12, if desired.

Figure 8:
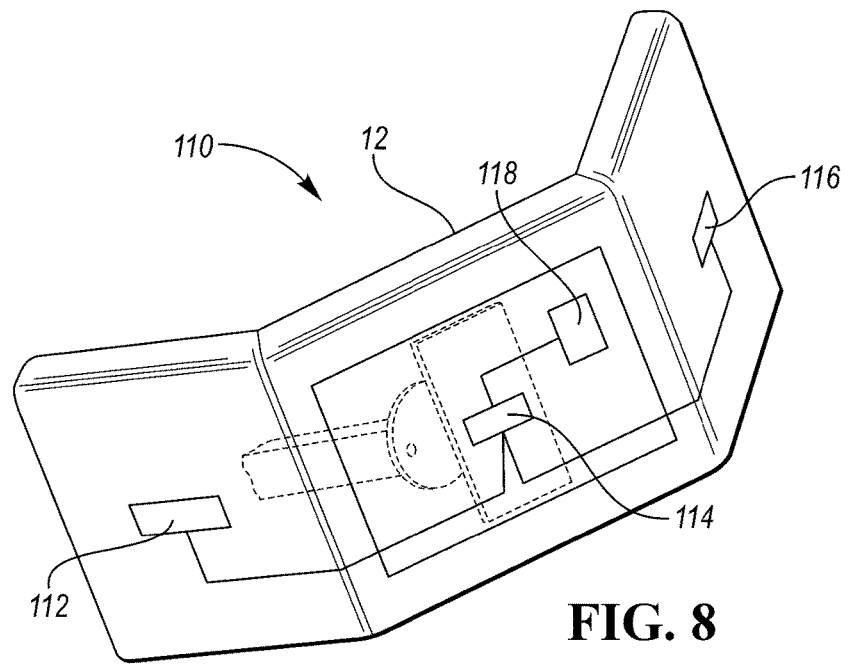
FIG. 8 is a partial perspective view of another embodiment of the disclosed system incorporating a vibrating balance reference.

Referring now to FIG. 8, in another embodiment of the system 110, a balance reference pad 12 is provided with one or more vibrating devices 112, 114, 116, which may be powered by a suitable conventional electrical power source 118 to provide a desired level of constant vibration, which vibration may be a fixed desired frequency, or varied within a desired range of frequencies, at the pad's surface, such that the user senses the vibration when his/her shins contact the pad 12. It will be appreciated that a vibrating contact surface not only provides the user with an immediate sense that his/her shins are properly positioned, but, in addition, may provide a relaxation of the muscles of the lower leg and feet to further assist in reducing and/or preventing the fatigue which otherwise accompanies maintaining a standing position for an extended period of time.

Referring still to FIG. 8, it should be appreciated that the vibrating devices 112, 114, and 116 of system 110 may alternatively or additionally be provided in the form of sound wave sources. Thus, for example, if devices 112, 114, and/or 116 include low-frequency sound emitters, the user will sense the proximity of his/her shins to the balance reference pad 12 when he/she senses the vibration caused by the emitted sound waves.

It should be noted that in each of the embodiments illustrated in FIGS. 7 and 8, a multi-faceted balance reference pad 12 is utilized. In these illustrated embodiments the pad 12 includes three contact surfaces. In the embodiment illustrated in FIG. 7, these surfaces are at the locations of each of the magnets 92, 94, and 96. In the embodiment illustrated in FIG. 8, the three contact surfaces are located at the locations of each of the vibrational/sound devices 112, 114, 116. It should be appreciated that, by providing multiple contact surfaces, particularly when oriented at varying angles, such as is shown in each of FIGS. 7 and 8, the user can shift his/her weight and or move his/her feet while, for example, moving to perform various tasks at the associated workstation, and still find a balance point and/or support on one of the multiple contact surfaces.

Figure 9:
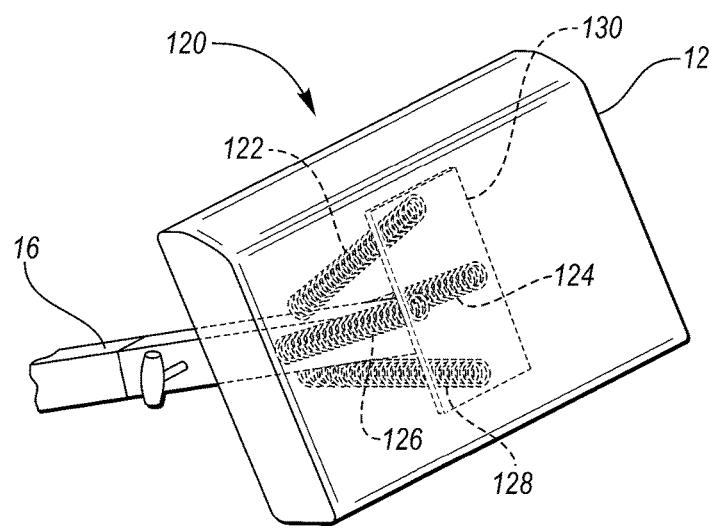
FIG. 9 is a partial elevated perspective view of another embodiment of the disclosed system employing a spring-mounted pad.

FIG. 9 illustrates yet another embodiment of the balance and stability system 120 wherein the balance reference pad 12 is mounted to support arm 16 via a plurality of spring elements 122, 124, 126, 128 each of which are connected at a first end of the spring to one end of the support arm 16, and at a second end of the spring to a mounting plate 130, which mounting plate 130 is secured to the pad 12. The spring elements 122, 124, 126, 128 may provide an additional range of flexion of the pad 12 in any desired direction to provide additional comfort for the user.

Figure 10:
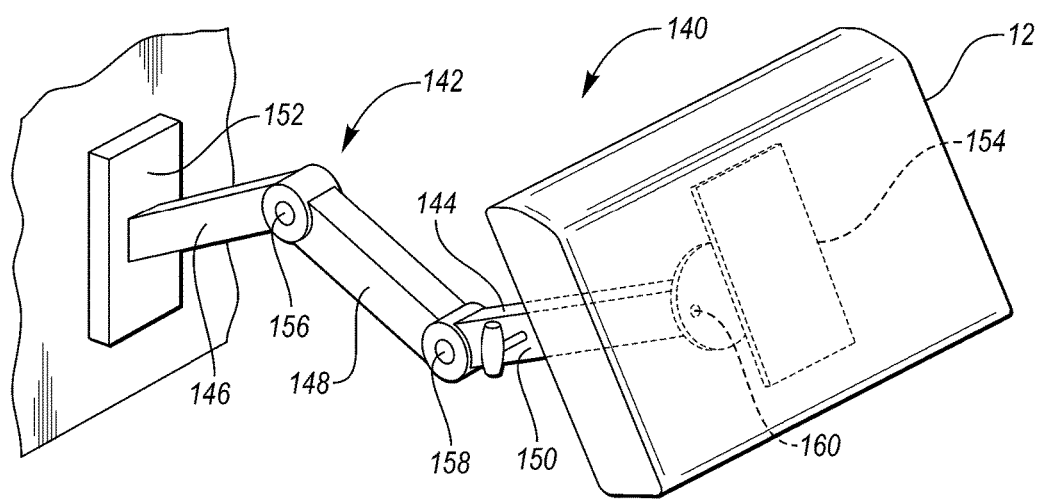
FIG. 10 is an elevated perspective view of another embodiment of the disclosed system employing a foldable support structure.

FIG. 10 illustrates another embodiment of the disclosed balance and stability system 140 wherein the balance in reference pad 12 is mounted on a pad support structure 142 which includes a support arm 144 which is comprised of several pivotally attached arm segments 146, 148, 150. Each of the segments 146, 148, and 150 are pivotally attached to an adjacent segment, and/or to a workstation mounting plate 152, and/or to the pad mounting plate 154 using one or more pivot pins 156, 158, 160, which may be tightened to secure the pad 12 in its desired position for use at the workstation, or loosened to fold the segments 146, 148, 150 of the support arm 144 to thereby move the pad 12 to a retracted, non-use position.

Figure 11:
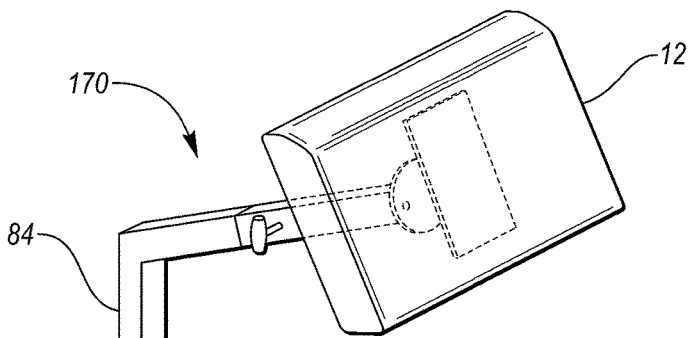
FIG. 11 is an elevated perspective view of another embodiment of the disclosed system anchored to the floor.

FIG. 11 illustrates another embodiment of the disclosed balance and stability system 170 wherein the lower end 86 of the support arm 84 is securely attached to an anchor plate 172, which anchor plate 172 may then be secured to the floor. The lower end 86 of the support arm 84 may be secured to the anchor plate 172 by various known methods, such as by welding, riveting, or by use of other conventional attachments. The anchor plate 172 may be similarly securely attached to the floor using conventional fasteners, such as, for example, bolts, or high-strength adhesives.

Figure 12:
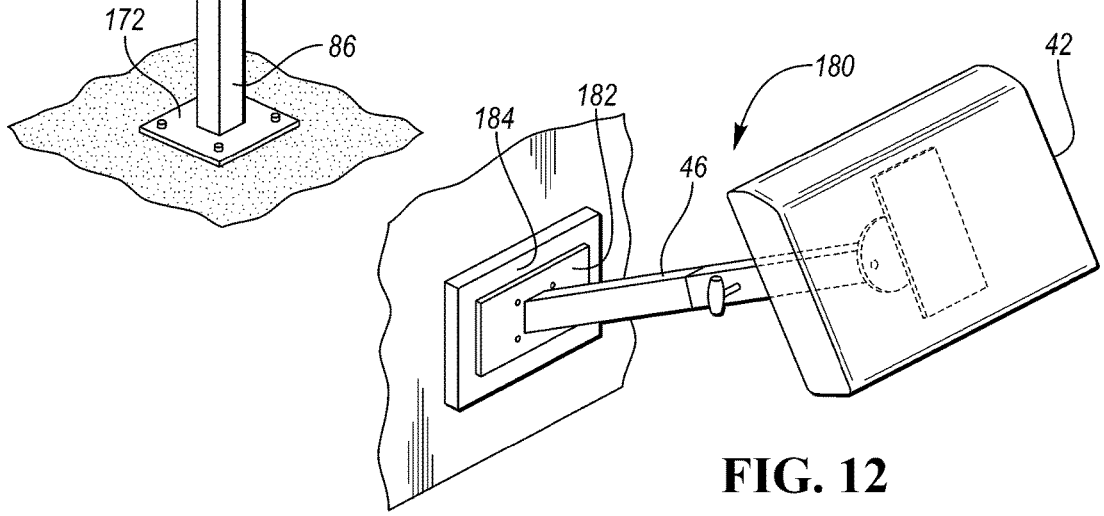
FIG. 12 is an elevated perspective view of another embodiment of the disclosed system including a magnetic mount.

FIG. 12 illustrates another embodiment of the disclosed system 180 wherein the mounting plate 182 of all includes a magnetic surface. A second magnetic plate 184 may then be secured to the base of a workstation such that the balance and support system may be installed and retained in place by the magnetic attraction between mounting plate 182 and the second magnetic plate 184.

Figure 13:
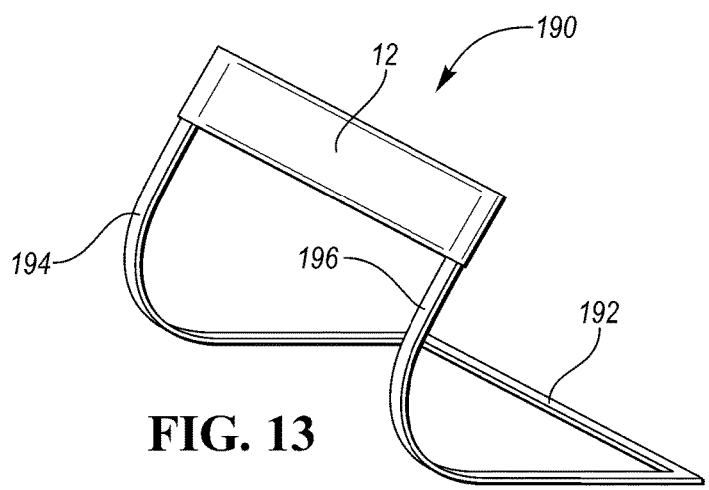
FIG. 13 is an elevated perspective view of another embodiment of the disclosed system including a resilient support stand.

FIG. 13 illustrates another embodiment of the disclosed system 190 wherein the pad 12 is attached to a support stand 192 which includes at least one resilient support arm 194 which is fabricated from spring steel or another suitably resilient material. In this disclosed embodiment, pad 12 is mounted on two spring steel support arms 194, 196, that are sufficiently strong enough to support the force applied by the user's shins to provide the balance assist describe herein, yet resilient enough that the arms 194, 196 "spring back", causing the pad to exert a subtle return force on the user's shin upon contact with the pad 12. The support stand 192 may be bolted or otherwise secured to the floor in the appropriate position relative to the work station, or the stand 192 may be configured to be attached directly to a workstation as previously described.

It should be appreciated that each of the disclosed embodiments of the balance and support system may be utilized in a variety of circumstances to help establish a standing user's center of balance with minimal body sway, thereby allowing the user to comfortably utilize both hands and make subtle movements of his/her upper body as required in the performance of his/her work while maintaining a sense of balance with minimum foot movement, foot muscle clenching, swaying, and other adjustments otherwise undertaken to maintain a balanced standing position.

It should also be appreciated that the various disclosed embodiments of the balance and support system may be used in myriad work and hobby applications where it is desired or required to maintain a standing position for an extended period of time. Some, but not all, examples of situations in which the disclosed embodiments, and other obvious variants, of the balance and support system may be useful, include:

| Manufacturing |
| --- |
| Machining |
| Machine operation |
| Assembly |
| Quality Control station |
| Plant Work Desk |
| Shipping & Receiving Desk |
| Education |

| Auditorium Speaking Podium |
| --- |
| Classroom Teaching Standing Desk |
| Student Standing desk |
| Research & Development |

| Laboratory Stations |
| --- |
| Auditorium Speaking Podium |
| Public |

| Public Use Railings |
| --- |
| Residential Applications |

| Kitchen Cupboards |
| --- |
| Kitchen Island Prep Areas |
| Laundry Room |
| Garage Work Bench |
| Industrial |

| Welding |
| --- |
| Shipping & Receiving |
| Assembly |
| Print Table |
| Meeting Room Podium |
| Retail Sales |

| Cashier |
| --- |
| Bagger |
| Stocking Carts |
| Sales Window |
| Transportation |

| Baggage Claim |
| --- |
| Ticket Sales |
| Boarding |
| Passenger Waiting Areas |
| Security Check Point line |
| Agricultural |

| Feed Stations |
| --- |
| Observation Stations |
| Health Care |

| Patient Rehabilitation |
| --- |
| Surgery OR |
| Patience Beds |
| Nursing Station |
| Nursing Carts |
| Patient Examination Room |
| Dentistry |
| Food & Drink |

| Drive Through Station |
| --- |
| Bartender |
| Cashier |
| Kitchen Stations |
| Government |

Public Service Employee Station
Sports and Entertainment

Ticket Station
Vendor Service Station
Gamers and Gamer Stations

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A balance and support system for use by an individual required to maintain a standing position at a specified location, the system consisting of:
   a balance reference pad including a contact surface for engaging the shin of an individual standing at the specified location such that, upon contact, the individual's lower leg is angled forward sufficiently to ensure that the individual is standing in balance; and
   a pad support structure including a generally horizontally oriented elongate support arm having first and second ends, the first end of the elongate support arm being mounted in a fixed location, and the second end of the elongate support arm being mounted to the balance reference pad such that the balance reference pad is supported at a vertical height sufficient to provide contact with the individual's shin at the desired location, and provide an uninterrupted space between the floor and the pad, and wherein the fixed location is at a sufficient horizontal distance from the second end of the support arm to thereby allow the individual to move her feet forward, rearward, and on either side of the pad without contacting the pad support structure.

2. The balance and support system of claim 1 wherein the fixed location is a work station, and the pad support structure further includes a mounting plate fixed to the work station, and the support arm is mounted at its first end to the mounting plate, whereby the balance and support system is mounted directly to the work station.

3. The balance and support system of claim 1 wherein the pad support structure further includes a base, and the support arm is mounted at its first end to the base.

4. The balance and support system of claim 3 wherein the base is fixed to a work station.

5. The balance and support system of claim 3 wherein the base is fixed to the floor.

6. The balance and support system of claim 3 wherein the base includes an elongate, generally vertically oriented post, and the support arm is mounted at its first end to the post.

7. The balance and support system of claim 6 wherein the post has a lower end and an upper end, the lower end of the post is mounted to the floor, and the support arm is mounted on the post at a location spaced apart from the lower end of the post sufficiently to provide an uninterrupted space between the floor and the pad.

8. The balance and support system of claim 6 further including a telescoping post.

9. The balance and support system of claim 3 wherein the support arm is pivotally mounted to the base.

10. The balance and support system of claim 1 wherein the pad is pivotally mounted on the support arm.

11. The balance and support system of claim 1 further including a telescoping support arm.

12. The balance and support system of claim 1 wherein the pad can support a force applied by at least one of the user's lower legs.

13. The balance and support system of claim 1 wherein the contact surface of the pad includes a soft surface.

14. The balance and support system of claim 1 wherein the contact surface includes a vibrating source.

15. The balance and support system of claim 14 wherein the vibrating source is sonic.

16. The balance and support system of claim 14 wherein the vibrating source is mechanical.

17. The balance and support system of claim 1 wherein the contact surface includes a heat source.

18. The balance and support system of claim 1 wherein the contact surface includes a cooling source.

19. A balance and support system for use by an individual required to maintain a standing position at a specified location, the system comprising:
   a balance reference pad including a contact surface for engaging the shin of an individual standing at the specified location such that, upon contact, the individual's lower leg is angled forward sufficiently to ensure that the individual is standing in balance, wherein the contact surface includes a first source of magnetic force;
   at least one removable shin sleeve including a second source of magnetic force, whereby the shin sleeve may be attached to a user's shin such that the magnetic force of the shin sleeve is repelled by the magnetic force from the contact surface as the shin sleeve is positioned in close proximity to the contact surface; and
   a pad support structure including a generally horizontally oriented elongate support arm having first and second ends, the first end being mounted in a fixed location, and the second end being mounted to the balance reference pad such that the balance reference pad is supported at a vertical height sufficient to provide contact with the individual's shin at the desired location, and provide an uninterrupted space between the floor and the pad to thereby allow the individual to move her feet forward, rearward, and on either side of the pad without contacting the pad support structure.

* * * * *